United States Patent
Mardinian et al.

(10) Patent No.: US 12,058,242 B2
(45) Date of Patent: Aug. 6, 2024

(54) METHOD FOR PROTECTING A PAYMENT TERMINAL

(71) Applicant: YOUTRANSACTOR, Paris (FR)

(72) Inventors: Grégoire Mardinian, Montmorency (FR); Sylvain Umdenstock, Paris (FR); Matthieu Sligar, Boulogne Billancourt (FR)

(73) Assignee: YouTransactor, Paris (FR)

( * ) Notice: Subject to any disclaimer, the term of this patent is extended or adjusted under 35 U.S.C. 154(b) by 680 days.

(21) Appl. No.: 17/256,833

(22) PCT Filed: Jun. 28, 2019

(86) PCT No.: PCT/EP2019/067471
§ 371 (c)(1),
(2) Date: Dec. 29, 2020

(87) PCT Pub. No.: WO2020/002677
PCT Pub. Date: Jan. 2, 2020

(65) Prior Publication Data
US 2021/0281398 A1    Sep. 9, 2021

(30) Foreign Application Priority Data
Jun. 29, 2018  (FR) ........................................ 1855990

(51) Int. Cl.
*G06F 21/72*    (2013.01)
*G06F 21/86*    (2013.01)
(Continued)

(52) U.S. Cl.
CPC ............ *H04L 9/0816* (2013.01); *G06F 21/72* (2013.01); *G06F 21/86* (2013.01); *G06Q 20/206* (2013.01);
(Continued)

(58) Field of Classification Search
CPC .. H04L 63/12; H04L 2209/56; H04W 12/125; H04W 12/12; G06F 21/72;
(Continued)

(56) References Cited

U.S. PATENT DOCUMENTS 9,818,004 B1 *  11/2017  Rezayee ............. G06K 7/0095
2017/0017943 A1    1/2017  Bilhan et al.
(Continued)

FOREIGN PATENT DOCUMENTS

| EP | 0965902 A2 | 12/1999 |
|----|-----------|---------|
| FR | 2871905 A1 | 12/2005 |

OTHER PUBLICATIONS

French Search Report for Application No. FR1855990, dated Nov. 27, 2018, pp. 1-2.
(Continued)

*Primary Examiner* — Shaqueal D Wade-Wright
(74) *Attorney, Agent, or Firm* — Young Basile Hanlon & MacFarlane, P.C.

(57) ABSTRACT

System and method for protecting a payment terminal are disclosed. The system includes a data encryption key, a monitoring module for measuring a physical parameter, and a counter unit of a microcontroller. The counter unit can be slaved to a clock for incrementing a counter value. The method includes measuring a physical parameter by the monitoring module, comparing the physical parameter with a predetermined threshold value corresponding to a physical attack, resetting the counter unit, and if the physical parameter is indicative of the physical attack on the payment terminal or the counter value is greater than a predefined threshold value, removing access to the encryption key.

14 Claims, 3 Drawing Sheets

(51) Int. Cl.
*G06Q 20/20* (2012.01)
*G06Q 20/38* (2012.01)
*H04L 9/08* (2006.01)
*G06F 21/75* (2013.01)

(52) U.S. Cl.
CPC ....... *G06Q 20/3829* (2013.01); *G06F 21/755* (2017.08); *H04L 2209/56* (2013.01)

(58) Field of Classification Search
CPC .......... G06F 21/86; G06F 21/55; G06F 21/71; G06F 21/70; G06F 21/75; G06F 21/556; G06F 21/755; G06Q 20/206; G06Q 20/3829
See application file for complete search history.

(56) References Cited

U.S. PATENT DOCUMENTS

2019/0026724 A1* 1/2019 Wade .................. G07F 7/1016
2019/0102760 A1* 4/2019 Rezayee ............. G06Q 20/105

OTHER PUBLICATIONS

International Search Report for Application No. PCT/EP2019/067471, mailed Jul. 24, 2019, pp. 1-3.
Jimenez-Naharro et al, Design and Implementation of a New Real-Time Frequency Sensor Used as Hardware Countermeasure, Sensors, Sep. 2013, pp. 11709-11727, vol. 13, ISSN 1424-8220, XP055441735.

* cited by examiner

METHOD FOR PROTECTING A PAYMENT TERMINAL

The present application is a national phase entry under 35 U.S.C. § 371 of International Application No. PCT/EP2019/067471, filed Jun. 28, 2019, which claims priority from French Application No. 1855990, filed Jun. 29, 2018, all of which are incorporated herein by reference.

FIELD OF THE INVENTION

The present invention relates to a method for protecting a payment terminal, in particular for payment by bank card. The present invention also relates to a secure payment terminal, particularly for payment by bank card.

PRIOR ART

Bank card payment terminals are dedicated to payment (such as a point-of-sale terminal with a built-in or separate keyboard for authentication by confidential code) or to the product distribution (such as an automatic teller or a self-service payment terminal for fuel.)

Bank card payment terminals must be compliant with the PCI PTS (Payment Card Industry Pin Transaction Security) standards. The latest version of the "PCI PTS V5" standard imposes protection standards relating to the active physical security of a payment terminal.

Active physical security according to the PCI PTS standard consists in protecting encryption keys (as well as other sensitive data items such as a card number, a personal identification number of the bearer, etc.) contained in the payment terminal from, among other things:

- physical intrusion by drilling or otherwise;
- the opening of the terminal;
- the use of the terminal in temperature zones for which it is no longer qualified;
- the variation of the clock frequencies to attempt to make the terminal operate in situations for which it is not qualified; and
- the operation of the terminal at voltages that are too low or too high.

Consequently, if the physical security of the terminal is compromised all the encryption keys stored in the terminal must be erased to protect the transactions, identities, applications etc.

The current methods for providing PCI PTS physical security consist in using specific microprocessors developed precisely for this security market. They have an integrated hardware circuit capable of managing and controlling the physical protections required by the PCI PTS standard. These security microprocessors are dedicated cryptographic microprocessors, specially designed to protect the encryption keys throughout their life cycle.

However, such secure microprocessors, which rely on specific hardware mechanisms, have a high cost.

In addition, if a physical security anomaly is detected, the terminal needs to be sent back for maintenance to be restored to functionality, which can prove expensive in cases where the anomaly does not stem from a genuine physical security attack.

There is thus a need for a bank payment solution that is less burdensome while still offering a level of security at least equivalent to the current solutions, making it possible to secure cryptographic keys and provide services of encryption, decryption, authentication and electronic signing for all application types.

There is also a need for a solution making it possible to easily differentiate between functional anomalies and a genuine physical security attack.

SUMMARY OF THE INVENTION

The aim of the present invention is to meet the needs described above by proposing a software protection method for a payment terminal securely processing and retaining the encryption keys of said terminal.

More precisely, the subject of the invention is a method for protecting a payment terminal, said payment terminal comprising:
- a data encryption key accessed for the encryption of data to be secured;
- a module for monitoring at least one physical parameter of the terminal comprising a means for measuring said physical parameter;
- a microcontroller;
- a counter unit of the microcontroller;
- a clock, the counter unit being slaved to said clock to increment at regular intervals a counter value of the counter unit;

said method comprising the following steps:
- measuring a physical parameter by the measuring means of the monitoring device;
- comparing the measured value with a predetermined threshold value, corresponding to a physical attack of said terminal by the monitoring device;
- deleting the access to the data encryption key by the microprocessor if one of the following conditions is met:
  - at least one physical parameter value signifies a physical attack of said terminal;
  - the counter value is greater than a predefined threshold value;
- reinitializing the counter unit by the monitoring device; and wherein the measuring, comparing, and reinitializing steps are executed periodically.

Advantageously, but optionally, the system according to the invention can further comprise at least one of the following features:
- the encryption key is generated by the combination of a plurality of keys stored in at least one memory of the terminal;
- the deleting step implements separate deletion methods for the first key stored in a memory area of register type of the microprocessor and the second key stored in a memory area of volatile memory type of the microprocessor;
- the encryption key is generated by the combination of a first and a second key, the first key being stored in a memory area of register type of the microprocessor, the second key being stored in a memory area of volatile memory type of the microprocessor and wherein the deleting step includes the deletion of at least one key of the associated memory area;
- the execution period T1 being randomly within an interval of predefined values [T1$a$; T1$b$];
- the method (100) also includes the following steps:
  - checking that the value of the predefined time period T1 is within a predefined interval of values, and if the value is not within the interval:
  - deleting at least one key from the plurality of keys;
- the payment terminal also includes a second clock with a predefined frequency to control the execution period T1, said clock being configured to transmit in a step an interruption to the microcontroller for the periodic execution of the measuring, comparing and reinitializing steps;

the terminal also includes a third clock with a predefined frequency and wherein the method includes a step of checking the frequency of the second clock comprising:
incrementing a counter unit at each clock signal of the second clock;
determining a frequency by computing the number of incrementations in one clock cycle of the third clock;
comparing the computed frequency with a predetermined frequency interval; and if the computed frequency is not within the interval
deleting at least one key from the plurality of keys;

the terminal also includes a step of checking the frequency of the third clock comprising:
incrementing a counter unit at each clock signal of the third clock;
determining a frequency by computing the number of incrementations in one clock cycle of the first clock;
comparing the computed frequency with a predetermined frequency interval; and if the computed frequency is not within the interval
deleting at least one key from the plurality of keys;

the terminal also includes a bandpass filter configured to filter a predefined frequency band and to receive a clock signal from the first clock, and said method also includes a step comprising the deletion of at least one key from the plurality of keys if no signal is present at the filter output;

the device for monitoring at least one physical parameter of the terminal includes one or more measuring means configured to:
measure the supply voltage of the payment terminal;
measure the operating temperature of the payment terminal;
detect the opening of the payment terminal; and
detect the drilling of the payment terminal.

the monitoring device is configured to emit a violation signal signifying a physical attack of said terminal; and wherein the microcontroller includes at least one port for receiving said violation signal; and wherein the access to the data encryption key is deleted on reception of said signal on said reception port;
the microprocessor is also configured to, prior to the deletion of the access to the data encryption key, execute a filtering algorithm after receiving the violation signal, said filtering algorithm detecting whether or not the violation signal signifies a physical attack of said terminal, and if this is the case, to delete the access to the data encryption key;

Such a method offers the advantage of using a software security architecture based on a standard general-purpose microcontroller to execute this architecture. The method being compliant with the requirements of the payment card industry, the software architecture provides protection from physical attacks and software attacks to guarantee the confidentiality and authenticity of the data. Thus, it is possible to construct a point of sale without the use of a standard "secure processor", making the proposed solution more economical.

The invention also has the subject of a computer program product comprising code instructions for executing a method for protecting a payment terminal, such as previously described, when this program is executed by a processor of said payment terminal.

Another subject of the invention is a secure payment terminal comprising:
a data encryption key, said encryption key being accessed for the encryption of data to be secured;
a device for monitoring at least one physical parameter of the terminal comprising a means for measuring said physical parameter;
a microcontroller;
a counter unit of the microcontroller,
a clock, the counter unit being slaved to said clock to increment at a regular interval a counter value of the counter unit;

said monitoring device being configured to periodically:
measure a physical parameter by the measuring means;
compare the measured value with a predetermined threshold value, corresponding to a physical attack of said terminal by the monitoring device;
delete the access to the data encryption key (MK) if one of the following conditions is met:
at least one physical parameter value signifies a physical attack of said terminal;
the counter value is greater than a predefined threshold value; and
reinitialize the counter unit.

Advantageously, but optionally, the secure payment terminal according to the invention can be further configured to implement a method as claimed in one of the previously described features.

DESCRIPTION OF THE FIGURES

Other features, aims and advantages of the invention will become apparent from the following description, which is purely illustrative and non-limiting, and which must be read with reference to the appended drawings, wherein.

DETAILED DESCRIPTION OF THE INVENTION

Figure 1:
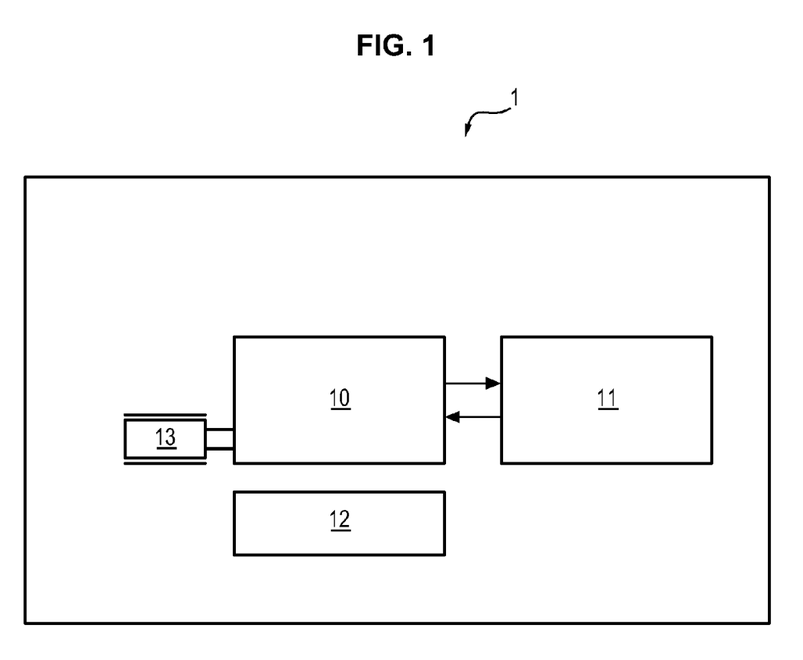
FIG. 1 illustrates a hardware architecture of a secure terminal implementing a method for protecting said terminal according to the invention.

With reference to FIG. 1, a payment terminal 1 is illustrated.

Said terminal 1 includes a microcontroller 10, for example relying on an electronic architecture based on an ARM core, such as a microcontroller of STM32 type (32-bit microcontroller). This usually includes a processor, memories (read-only memory and random-access memory), peripheral units and input-output interfaces.

The microcontroller 10 also includes a Real-Time Clock (RTC), allowing a very accurate time count, for the purpose of dating or triggering events according to the time. This clock for example uses a piezoelectric quartz crystal.

The real-time clock requires a clock signal or a quartz crystal oscillator to keep time. The microcontroller 10 therefore includes means for interacting with a (so-called LSE for Low Speed External) external clock 13 used to control the internal real-time clock. Said clock 13, contained in the payment terminal 1, preferably provides a clock frequency between approximately 30 and approximately 34 Khz, preferably of 32.768 KHz.

The microcontroller 10 also includes power supplying means 12, for example by a battery wherein cells supply the main electrical power supply. When the main power supply is removed, a back-up power supply (such as an internal button battery) keeps the terminal 1 energized.

Advantageously, the provision is made for the payment terminal to operate within a predetermined voltage range.

Preferably, the main supply voltage (Vcc) is regulated to 3.3 V to power the whole payment terminal 1.

The microcontroller 10 also includes means for interacting with hardware security components (for example input/output ports known as GPIO for General Purpose Input/Output) described in more detail in the rest of the description.

Figure 2:
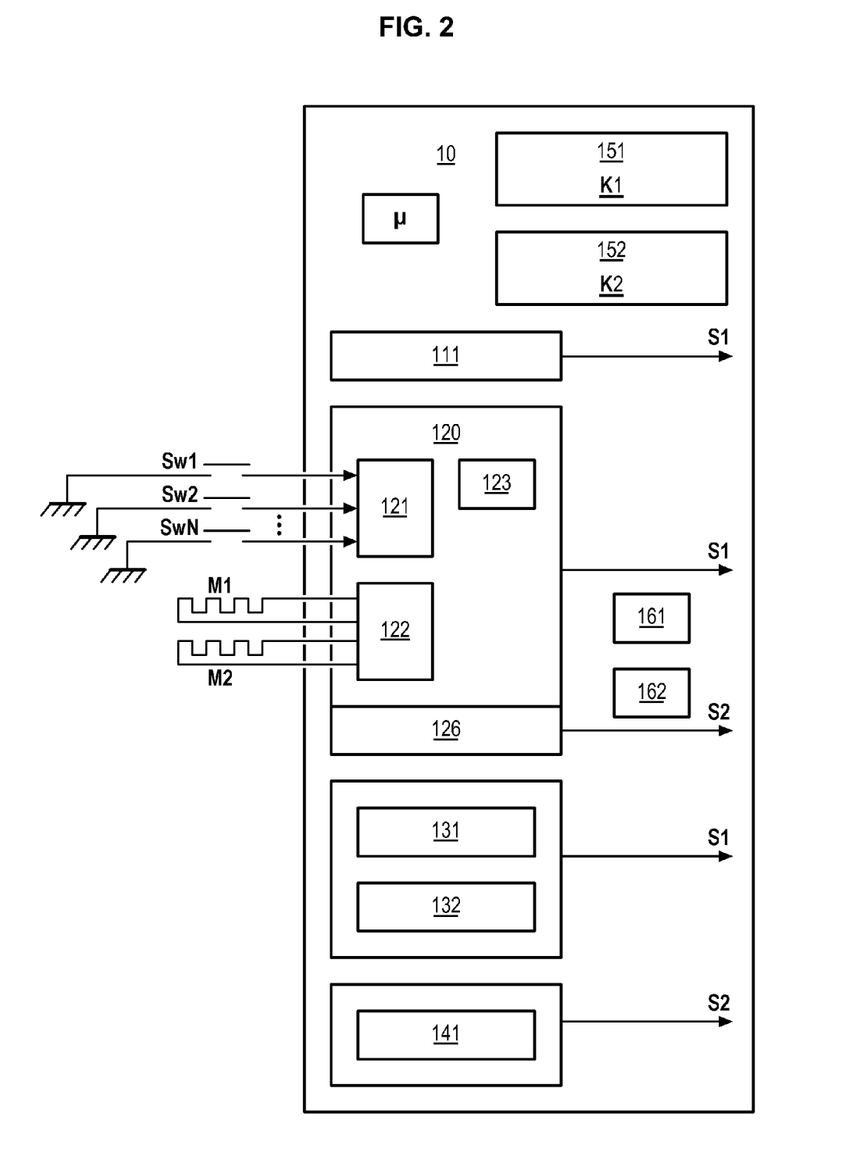
FIG. 2 illustrates in more detail the hardware architecture of the secure terminal according to the invention.

With reference to FIG. 2, the microcontroller 10 will now be detailed.

The microcontroller 10 includes two internal clocks 161 and 162.

The internal clock 161 is of HSI (HiSpeed internal) type. It is configured to supply a clock frequency of approximately 16 MHz.

The internal clock 162 is of LSI (LowSpeed internal) type. It is configured to supply a clock frequency between approximately 30 and approximately 34 KHz, preferably of 32.768 KHz.

Advantageously, these internal clocks (161,162) are difficult to attack (in the sense of disruption) without destroying the microcontroller 10, as they are located inside the latter.

The microcontroller 10 also includes a memory 151 including registers. A register is a memory location internal to a processor. The registers are located at the apex of the memory hierarchy, having a very fast read/write access time.

The microcontroller 10 further includes a volatile memory 152: it cannot go without power at the risk of the information stored in it being irretrievably erased.

The memory 152 is preferably of SRAM (Static Random Access Memory) type, it is particularly suitable for applications requiring either short access times, and/or low power consumption.

The processor u of the microcontroller 10 is configured to implement a write-protected secure software cryptographic library, and includes a true random number generator, as well as protections from side-channel attacks such as power consumption analysis attacks (for example by DPA and SPA) and clock synchronization attacks.

The processor u of the microcontroller 10 is also configured to implement instructions for executing a software protection method.

Preferably, the hardware and security functionality is grouped together in a secure application system core, which is separate from the non-security-related functions, at a very low execution level using the capacity of the microcontroller 10. Specifically, said core has privileges to access all the hardware resources of the processor u (particularly the GPIO), and controls part of the processor which manages the protection of access to the memory (for example the so-called MPU for Memory Protection Unit for an ARM processor). Thus, sensitive data items (such as cryptographic keys) are private at the secure core, and encrypted by a main key MK known (i.e. accessible) only to the secure core.

The main part of the software protection method includes a "secure software loop" executed by the processor u in order to protect the main key MK. Said loop makes it possible to detect security attack events and trigger the erasure of the main key MK should such an event occur, making data theft or cloning of the payment terminal 1 extremely difficult.

Also, the security loop can make it possible to collect these security attack events, to apply a filter to these events where applicable, then trigger the erasure of the main key MK.

The main key MK to be protected meets an encryption standard, for example the AES128 standard, AES (Advanced Encryption Standard) with a key of 128, 192 or 256 bits in length.

Preferably, in order to have redundancy on the erasure of the key MK, this is generated from the combination of at least two keys K1 and K2, for example by the XOR combination of K1 and K2. Only the keys K1 and K2 are stored in the memory, the key MK thus never being stored in a persistent memory in unencrypted form. The keys K1, K2 can be stored in separate memory areas.

Thus, the key K1 is for example stored in an internal memory location of a register 151 of the microprocessor. Advantageously, such a memory location makes it possible to obtain a very fast read/write access time.

Moreover, these registers 151 can be reinitialized via an external GPIO input which allows virtually instantaneous erasure.

Meanwhile, the key K2 is for example stored in a static or dynamic random-access internal memory 152 of RAM, SRAM or FLASH type. Optionally, the key K2 is stored at a randomly determined address.

Optionally, the registers 151 and the random-access internal memory 152 use different erasure mechanisms, which advantageously makes it possible to increase the software protection.

Figure 3:
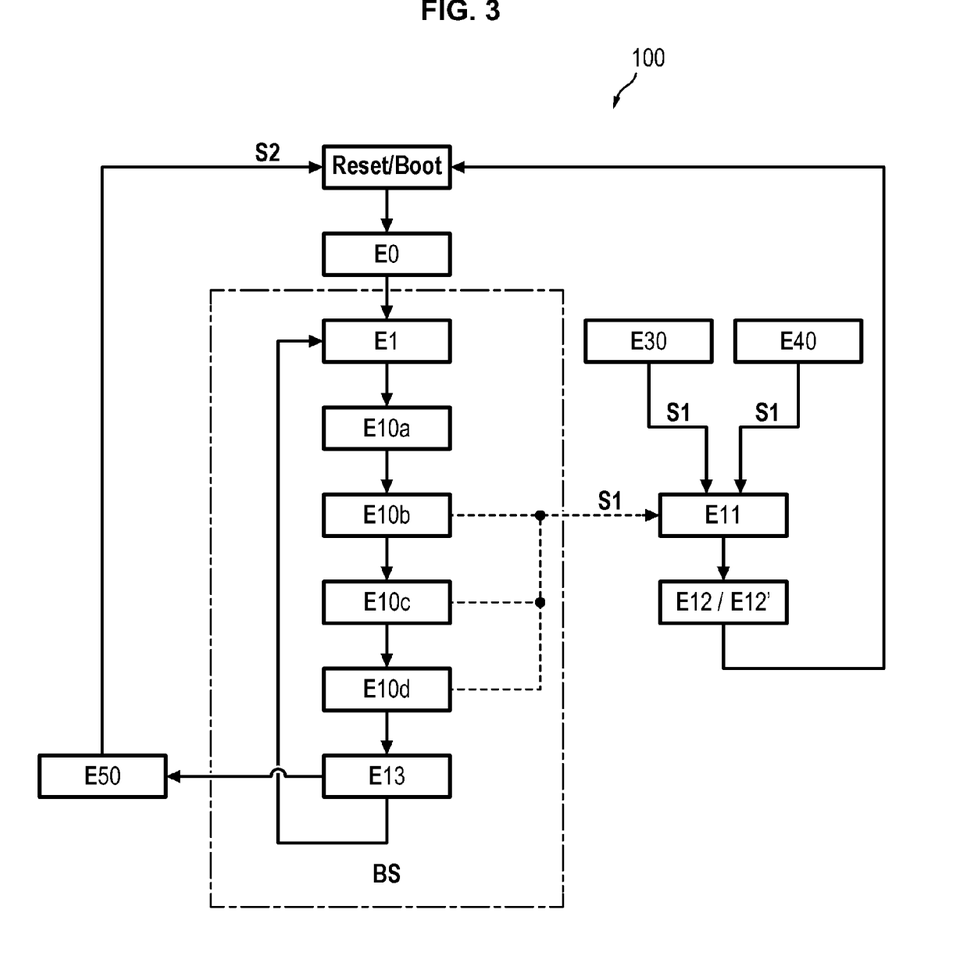
FIG. 3 illustrates steps of a method for protecting the terminal according to the invention.

With reference also to FIG. 3, a method 100 for protecting a payment terminal 1, implementing a security loop BS will now be described.

The method 100 makes it possible to protect the payment terminal 1 by monitoring against physical attacks and software attacks to guarantee the confidentiality and authenticity of the data. The physical attacks under consideration are for example linked to the alteration of the device, to the temperature, the clock, under- or overvoltage, electromagnetic pulses, and frequency scanning.

Following the start-up (boot) or the re-start following a reinitialization (reset) of the payment terminal 1, the method 100 includes a step E0 of initializing the method 100. At launch, if the keys K1 and K2 already have a value, they are deleted, then the random generator is used to generate a random sequence that becomes the new set of keys K1, K2.

The security loop BS can be continuously executed. However, for preference, to limit power consumption, the security loop BS is executed periodically, for example approximately every 100 ms, thus the rest of the time the microcontroller 10 is in a state of stand-by.

Thus, after the initialization step E0, in a step E1, the security loop BS is started, but put in stand-by.

A timer unit 111 is used to enable the execution of the loop BS periodically.

The timer unit 111 is for example controlled by the LSE clock. Said unit 111 periodically generates interruptions addressed to the processor u of the microcontroller 10. These interruptions make it possible to temporarily stop the normal execution of a background task program of the payment terminal 1, for the purpose of executing the security loop BS.

Advantageously, to avoid an attacker synchronizing with the security loop BS, the value of the time between two iterations of the loop is random between approximately 80 ms and approximately 100 ms.

With this aim, the timer unit 111 uses the internal random generator of the microcontroller 10 to generate a random variation of less than approximately 20 ms.

The microcontroller 10 further ensures that this random number is not used for other purposes.

Below is a more detailed description of the physical attacks that the method 100 and the secure payment terminal 1 are responsible for monitoring.

Opening

An attack of sabotage by opening occurs when the payment terminal 1 is opened or when an unexpected component enters a secure area of said terminal 1. The opening of the terminal 1 is detected owing to a plurality of switches (Sw1, Sw2, . . . , SwN) located at different places of a box of the terminal 1. The switches are for example implemented by GPIOs configured at the input of the microcontroller 10, raised by resistors internal to the microcontroller 10.

When the terminal 1 is closed, these signals are connected to a phase at the ground of the payment terminal 1.

An opening monitoring module 121 has the function of detecting a state of opening of the terminal by monitoring the value of the plurality of signals transmitted by the switches (Sw1, Sw2, . . . , SwN). For example, in a non-open state of the terminal, the switches have as value a first value (for example equal to 0). If the terminal is open, at least one of the switches, according to its location, is able to detect this opening, taking a second value (for example equal to 1). The opening monitoring module 121 has the function of detecting such a change in the value of at least one switch and transmitting a violation signal S1 to the microcontroller 10. This can be configured to include means for receiving said violation signal S1, such as one or more specific ports, wherein the reception of a signal at said microprocessor 10 signifies the detection of an attack. Said ports can be specific to a type of attack or not.

Drilling

The drilling of the terminal 1 is detected owing to at least one wire mesh. This is implemented for example by a mesh connected to the interfacing means of the microcontroller. For example, a mesh is a pair (A, B) of GPIOs. At least two meshes M1, M2 are thus necessary to protect the apparatus from drilling. GPIO A is configured as the input and GPIO B as the output.

A drilling monitoring module 122 writes a random sequence, for example of 16 bits, to the output (the bit rate being chosen as a function of the hardware limitations, specifically, the rise and fall time depends on the length of the mesh). The same sequence must be read on the GPIO input. Next, GPIO B is defined as the input and A as the output and the same check is applied.

The random bit sequence applied is chosen at random from among a set of possible sequences (for example at least 20). The random sequence is generated by the internal true random number generator of the microcontroller 10. Furthermore, the latter ensures that the random sequence is not used for other purposes.

Consequently, if the received sequence does not match the predefined sequence, the monitoring module 122 is configured to transmit a violation signal S1 to the microprocessor 10.

Temperature

A temperature attack is detected when the current temperature of the payment terminal 1 is greater than or less than an expected temperature range. For example, the normal operating temperature range is approximately [−30° C.; +85° C.].

The microcontroller 10 for example includes at least one built-in temperature sensor for implementing the monitoring of the temperature.

A temperature monitoring module 123 has the function of measuring the temperatures, via the temperature sensor(s), detecting an abnormal state of the temperature if the measured temperature is not in the intended normal operating region, and in this case transmitting a violation signal S1 to the microprocessor 10.

Clock Frequency

The monitoring functions executed by the various monitoring modules 121 to 123 therefore make it possible to carry out secure monitoring responsible for detecting a variety of physical attacks.

A security module 120 contains the monitoring modules 121 to 123 and the associated monitoring functions. Said security module 120 is configured to carry out secure monitoring and detect security attacks on the payment terminal 1 by implementing the security loop BS (which executes the functions of the security module 120) described previously.

Thus, in a step E10a, measurements are taken of the different physical parameters to be monitored by the measuring means of the security module 120.

In a step E10b, the measured values are then compared with predetermined threshold values, corresponding to physical attacks of the terminal 1. If a comparison signifies a physical attack of the terminal 1, a violation signal S1 is transmitted to a reception port of the microprocessor 10

To ensure that the security loop BS is systematically executed despite the attacks, the frequency of the clock that controls the timer unit 111, the LSE clock (Low Speed External Clock), is checked by a counter controlled by the HSI (High Speed Internal Clock).

With this aim, in a step E10c, the security module 120 makes in the security loop BS a first count of the number of "strikes" (such as a rising or falling edge of a clock signal) of the HSI clock in one cycle of the LSI clock to check that the frequency of the HSI clock is within an acceptable frequency interval (for example within the normal operating range [+/−30 KHz). If this condition is not verified a violation signal S1 is transmitted to a reception port of the microprocessor 10.

Then, in a step E10d, the security module 120 makes in the safety loop BS a second count of the number of strikes of the LSE clock in one cycle of the HSI clock to check that the frequency of the LSE clock is within an acceptable frequency interval (for example within the normal operating range [30 KHz-34 KHz]). If this condition is not verified a violation signal S1 is transmitted to a reception port of the microprocessor 10

The method 100 also includes another mechanism to ensure that the loop BS is regularly executed.

Thus the method 100 includes a so-called "watchdog" mechanism implemented by a module 126 for monitoring the loop BS, for example configured to implement a counter that is regularly reset to zero. If the counter exceeds a given value (timeout) then there is a restart (reset) of the payment terminal 1.

More precisely, the module 126 for monitoring the loop BS is started at the starting of the payment terminal 1 and can never be stopped as long as the latter is in operation. If the counter reaches a predefined value, the terminal 1 is reinitialized.

Only the secure loop BS "updates" the counter of the loop monitoring module 126 in a step E13, specifically, preferably only the secure loop BS has access to the counter 126. The refreshing operation is done only once during the monitoring cycle (i.e. the watchdog is updated in the periodic secure loop process when all the monitoring has been processed in a given interval of time).

The loop monitoring module 126 compares the counter with a predefined limit value to monitor if the security loop BS is not executed in the predefined time.

Thus, if this situation occurs, the counter of the watchdog will reach the predefined limit value, and in a step E50, the loop monitoring module 126 transmits a restart signal S2 to the microprocessor 10.

Advantageously, this guard dog mechanism makes it possible to ensure that all the code related to security is executed over time.

Preferably, the watchdog expiry time is approximately equal to the "Periodic monitoring period+50 ms."

The counter of the loop monitoring module 126 is driven by the LSI clock, to be incremented at each stroke of the clock (reception of a rising or falling edge of the clock signal). The frequency of the LSI clock is therefore also monitored to check that there is no attack on the payment terminal 1 by manipulating the frequency of said LSI clock in an abnormal frequency region, with the aim of causing a malfunction of the payment terminal 1.

Thus, the checking of the frequency of the LSI (for example within the normal operating range [30 KHz-34 KHz]) is done in a step E30 by a frequency checking module 131, implemented for example by an external bandpass circuit associated with a transistor, the output of which controls the transmission of a violation signal S1 to a reception port of the microprocessor 10.

Supply Voltage

A security attack is considered to have occurred when the supply voltage of the microcontroller 10 is less than or greater than threshold values.

The voltage Vcc of the microcontroller 10 is supplied by the main power supply when the battery is connected and by the back-up power supply when the battery is removed. The system being thus normally always supplied, the loss of Vcc is considered as a security attack.

The microcontroller 10 includes a low voltage monitoring module 141 for measuring the voltage and detecting when the voltage is less than a threshold value, for example when the voltage drops to below approximately 2.2V.

The low voltage monitoring module 141 is for example implemented by a voltage drop reinitialization circuit internal to the microprocessor 10, said circuit being configured to transmit a reinitialization signal S2 to the microprocessor 10.

The reinitialization has the effect of deleting the data from the random-access memory, and therefore deleting the key K2. Preferably, the reinitialization is detected "instantly" (i.e. it is a hardware-only circuit). To optimize the time period of deletion of the key K2, this can be placed in an address area at the start of the memory 152.

A security attack is considered when Vcc is for example above 3.7V.

A high voltage monitoring module 132 is responsible for the high voltage monitoring, for example in the form of an external monitoring controller of very low power. This is configured to, in a step E40, detect when the voltage is greater than a threshold value for example 3.7V, and if this condition is verified, transmit a violation signal S1 to a reception port of the microprocessor 10.

The microcontroller 10 includes ports dedicated to the reception of a violation signal S1.

Thus, in a step E11, on reception of a signal on one of these ports, the microcontroller 10 proceeds to delete the key K1 stored in a register memory 151. This processing makes it possible to have as short as a deletion time as possible, since the execution of the deletion command does not depend on a clock signal. Furthermore, the command can be executed even if the different clocks are not operational.

In parallel, the memory area 152 in which the key K2 is stored is also erased.

The microcontroller 10 also includes ports dedicated to the reception of a reinitialization signal S2.

Thus, on receiving a signal on one of these ports, the microcontroller 10 deletes the key K2 stored in a volatile memory in a step Reset.

By way of example, the erasure time for a word of 32 bits in a memory of SRAM2 type is of 1 clock cycle (i.e. 250 ns). The full SRAM2 erasure time is 8192*250=2.048 ms.

Also, in a step E12, the safety module can record the types of alarm and the "date" at which each alarm is perceived. Advantageously, the recorded data can be analyzed when the terminal goes into maintenance following a security attack.

In an alternative embodiment, the payment terminal 1 can also comprise a filtering module (not shown).

Thus, in a step E12', when the security module detects an anomaly, the filtering module is configured to process the alarm and to then execute a filtering/detection algorithm for one or more iterations of the security loop BS. Said algorithm makes it possible to declare if the alarm signifies a real situation of tampering of the terminal, and if so, carry out the deletion of one or more stored keys.

In a particular embodiment, a filtering/detection algorithm is such that on receiving one or more violation signals S1 within a first determined time period, the microcontroller 10 deletes the key K1 if a violation signal S1 is received within a second determined time period (for example approximately one second). Such an algorithm makes it possible to perform a filtering of the original mechanical events (opening, drilling etc.). Thus, if several mechanical events are simultaneously detected and stop before the predetermined time period has expired, the MK is not deleted, since this is for example the signature of a model of a dropping of the terminal 1.

To avoid hackers, after having access to this algorithm, using this filter to attack the terminal more easily, the filtering system cannot be enabled during a time period (a component of which is random) following a filtering sequence of one and the same event. This does not have any effect in a situation of normal use since for example in the case of a drop event, it is not very likely that the same terminal will be caused to drop twice in a row in under a few seconds.

Moreover, advantageously the terminal 1 can also be configured with physical attack models, using attack events collected for several types of drop, during the design or test phase of the terminal. This model is thus used to filter attacks during the lifetime of the product.

Advantageously, this makes it possible to avoid declaring an attack when the detection of an attack only stems from transient interference.

Furthermore, the data (alarm(s) and date(s)) recorded by the payment terminal 1, or by a plurality of payment terminals 1, can be analyzed to refine the filtering/detection algorithm.

The invention claimed is:

1. A method for protecting a payment terminal, the payment terminal comprising:
    a data encryption key accessed for encryption of data to be secured;
        a module for monitoring at least one physical parameter of the payment terminal;
        a microcontroller;
        a counter unit of the microcontroller;
        a first clock, the counter unit being slaved to the first clock to increment at regular intervals a counter value of the counter unit;
        a second clock with a predefined frequency;
        a timer unit, controlled by the second clock, configured to generate a periodic interruption to the microcontroller to trigger the microcontroller to execute the method, the timer unit generating the periodic interruption randomly from an interval of predefined time values;
    the method comprising the following steps:
        measuring, by the module, the at least one physical parameter;
        comparing, by the module, the at least one physical parameter with a predetermined threshold value corresponding to a physical attack of the payment terminal;
        deleting the access to the data encryption key by a microprocessor if at least one of the following conditions are met:
            the at least one physical parameter value signifies the physical attack of the payment terminal; or
            the counter value is greater than a predefined threshold value; and
        reinitializing, by the module, the counter unit.

2. The method for protecting the payment terminal, as claimed in claim 1, wherein the encryption key is generated by a combination of a plurality of keys stored in at least one memory of the payment terminal.

3. The method for protecting the payment terminal, as claimed in claim 2, wherein the encryption key is generated by a combination of a first and a second key, the first key being stored in a memory area of register type of the microprocessor, the second key being stored in a memory area of volatile memory type of the microprocessor, and wherein the deleting step includes a deletion of at least one key of an associated memory area.

4. The method for protecting the payment terminal, as claimed in claim 3, wherein the deleting step implements separate deletion methods for the first key stored in the memory area of register type of the microprocessor, and the second key stored in the memory area of volatile memory type of the microprocessor.

5. The method for protecting the payment terminal as claimed in claim 1, wherein an execution period T1 being randomly within an interval of predefined values [T1a; T1b].

6. The method for protecting the payment terminal, as claimed in claim 5, wherein the method also includes the following steps:
    checking that a value of the execution period T1 is within the interval of predefined values, and if the value is not within the interval:
        deleting at least one key from the plurality of keys.

7. The method for protecting the payment terminal as claimed in claim 6, wherein the payment terminal also includes a third clock with a predefined frequency and wherein the method includes a step of checking the frequency of the second clock comprising:
    incrementing a counter unit at each clock signal of the second clock;
    determining a frequency by computing the number of incrementations in one clock cycle of the third clock;
    comparing the computed frequency with a predetermined frequency interval; and if the computed frequency is not within the interval
    deleting at least one key from the plurality of keys.

8. The method for protecting the payment terminal, as claimed in claim 7, wherein the payment terminal also includes a step of checking the frequency of the third clock comprising:
    incrementing a counter unit at each clock signal of the third clock;
    determining a frequency by computing the number of incrementations in one clock cycle of the first clock;
    comparing the computed frequency with a predetermined frequency interval; and if the computed frequency is not within the interval
    deleting at least one key from the plurality of keys.

9. The method for protecting the payment terminal as claimed in claim 1, wherein the payment terminal also includes a bandpass filter configured to filter a predefined frequency band and to receive a clock signal from the first clock, and the method also includes a step comprising the deletion of at least one key from the plurality of keys if no signal is present at filter output.

10. The method for protecting the payment terminal, as claimed in claim 1, wherein the module for monitoring the at least one physical parameter of the payment terminal is configured to:
    measure the supply voltage of the payment terminal;
    measure the operating temperature of the payment terminal;
    detect the opening of the payment terminal; and
    detect the drilling of the payment terminal.

11. The method for protecting the payment terminal, as claimed in claim 1, wherein
    the module is configured to emit a violation signal signifying the physical attack of the payment terminal; and wherein
    the microcontroller includes at least one port for receiving the violation signal;
    and wherein the access to the data encryption key is deleted on reception of the violation signal on the reception port.

12. The method for protecting the payment terminal, as claimed in claim 11, wherein the microprocessor is also configured to, prior to the deletion of the access to the data encryption key, execute a filtering algorithm after receiving the violation signal, the filtering algorithm detecting whether or not the violation signal signifies the physical attack of the payment terminal, and if this is the case, to delete the access to the data encryption key.

13. A non-transitory computer-readable storage medium that includes instructions that, when executed by a processor, causes the processor to execute a method for protecting a payment terminal, the payment terminal comprising:
    a data encryption key accessed for encryption of data to be secured;
    a security module for monitoring at least one physical parameter of the payment terminal;
    a microcontroller;
    at least one counter unit of the microcontroller;
    a first clock, a first counter unit being slaved to the first clock to increment at regular intervals a counter value of the first counter unit;

a second clock with a predefined frequency;
a third clock with a predefined frequency;
a band-pass filter configured to filter a predefined frequency band and to receive a clock signal from the first clock;
a timer unit, controlled by the second clock, configured to generate a periodic interruption to the microcontroller to trigger the microcontroller to execute the method, the timer unit generating the periodic interruption randomly from an interval of predefined time values;
the method comprising the following steps:
measuring the at least one physical parameter by the security module;
comparing the at least one physical parameter with a predetermined threshold value corresponding to a physical attack of the payment terminal by the security module;
checking, by the security module, a frequency of the second clock by:
    incrementing a second counter unit at each clock signal of the second clock,
    determining the frequency by computing the number of incrementations of the second counter in one clock cycle of the third clock, and
    comparing the computed frequency with a predetermined frequency interval;
checking, by the security module, a frequency of the third clock by:
    incrementing a third counter unit at each clock signal of the third clock,
    determining the frequency by computing the number of incrementations of the third counter in one clock cycle of the first clock, and
    comparing the computed frequency with a predetermined frequency interval;
checking, by the security module, the frequency of the first clock by:
    sending a clock signal to an input of the band-pass filter;
deleting the access to the data encryption key by a microprocessor if at least one of the following conditions are met:
    the at least one physical parameter value signifies the physical attack of the payment terminal;
    the first counter value is greater than a predefined threshold value;
    the frequency of the second clock is not within the predefined frequency interval;
    the frequency of the third clock is not within the predefined frequency interval; or
    no signal is present at an output of the band-pass filter; and
reinitializing, by the security module, the first counter unit.

14. A payment terminal, the payment terminal comprising:
a data encryption key accessed for encryption of data to be secured;
a processor for monitoring at least one physical parameter of the payment terminal;
a microcontroller;
a counter unit of the microcontroller;
a first clock, the counter unit being slaved to the first clock to increment at regular intervals a counter value of the counter unit;
a second clock with a predefined frequency; and
a timer unit, controlled by the second clock, configured to generate a periodic interruption to the microcontroller to trigger the microcontroller to execute a method, the timer unit generating the periodic interruption randomly from an interval of predefined time values,
wherein the processor is configured to:
    measure the at least one physical parameter;
    compare the at least one physical parameter with a predetermined threshold value corresponding to a physical attack of the payment terminal; and
    reinitialize the counter unit; and
wherein the microprocessor is configured to:
    delete the access to the data encryption key if at least one of the following conditions are met:
        the at least one physical parameter value signifies the physical attack of the payment terminal; or
        the counter value is greater than a predefined threshold value.

* * * * *